United States Patent [19]

Penhorwood

[11] 4,104,550

[45] Aug. 1, 1978

[54] MOTOR SEALS

[75] Inventor: Herbert F. Penhorwood, Owosso, Mich.

[73] Assignee: Universal Electric Company, Owosso, Mich.

[21] Appl. No.: 747,064

[22] Filed: Dec. 3, 1976

[51] Int. Cl.$^2$ ............................................ H02K 11/00
[52] U.S. Cl. ...................................... 310/71; 310/42; 310/87; 310/112; 174/77 R; 277/121; 417/422
[58] Field of Search ..................... 310/87, 114, 71, 66, 310/112, 91, 42, 89, 113, 273, 43; 339/60, 94, 103; 174/60, 77 R, 66 SS; 285/137 R; 336/107, 192; 417/422; 277/102, 121, 183

[56] References Cited

U.S. PATENT DOCUMENTS

| | | | |
|---|---|---|---|
| 965,684 | 7/1910 | Bierce | 174/60 |
| 1,844,409 | 2/1932 | Rypinski | 174/77 R |
| 2,076,261 | 4/1937 | Bauroth | 174/77 R |
| 2,941,025 | 6/1960 | Wayman | 174/65 SS |
| 3,308,316 | 3/1967 | Pfahl | 310/87 |
| 3,555,319 | 1/1971 | Schaefer | 310/87 |
| 3,604,964 | 9/1971 | Conrad | 310/87 |

Primary Examiner—R. Skudy
Attorney, Agent, or Firm—Barnes, Kisselle, Raisch & Choate

[57] ABSTRACT

A submersible motor comprising a first housing including a motor and a second housing enclosing electrical connections between the motor and a jacketed electrical cord to the second housing. The first housing has a cavity therein in the periphery thereof. A body of compressible resilient elastomeric material is positioned in the cavity and has an exterior configuration and dimensions which conform generally with the configuration and dimensions of the cavity. The body has a plurality of generally axial passages therein through which the magnet wires from the motor extend. The wires have a diameter so that they can be readily inserted through the passages in the body. The second housing has an annular wall extending axially through the open end of the cavity in the first housing and operable, when the second housing is in mounted position on the first housing, to compress the body radially into tight conformity with the wires from the motor.

2 Claims, 5 Drawing Figures

MOTOR SEALS

This invention relates to submersible motors and particularly to seals for submersible motors.

BACKGROUND AND SUMMARY OF THE INVENTION

In submersible electrical devices such as motors or pumps, it is sometimes necessary to bring the leads from the winding of the motor from a sealed oil filled cavity containing the motor to an adjacent isolated cavity wherein connections are made to an outlet cord and possibly a pressure switch.

Past efforts to meet the sealing requirements have largely centered around three basic approaches all workable but possessing disadvantages one of which being excessive costs. These current methods include (1) the use of the well known threaded compression screw to effect a seal to the outer diameter of the lead which is emerging from a threaded hole in the cavity, (2) the screwing down of a metal plate to compress a follower washer against a rubber ring seal which in turn compresses against the outer diameter of the lead and (3) the potting of an epoxy resin around the lead and bonding to the internal diameter of the hole in the cavity.

The costs involved in using threaded components is obvious and is amplified by the assembly of multiple parts. Another disadvantage is the excess of radially inward force due to the high mechanical advantage of the threads which sometimes create a thinning down of the lead insulation to the point where it becomes susceptable to mechanical abuse. Potting processes are at best inconvenient and often messy creating bottlenecks in high production assembly due to the need for application of heart and/or long cure times.

The present invention is intended to eliminate the aforementioned disadvantages by using unique and simple means for effecting a suitable seal where it is required to bring the motor leads from an oil filled cavity into an adjacent cavity for making electrical connections.

DESCRIPTION

Figure 1:
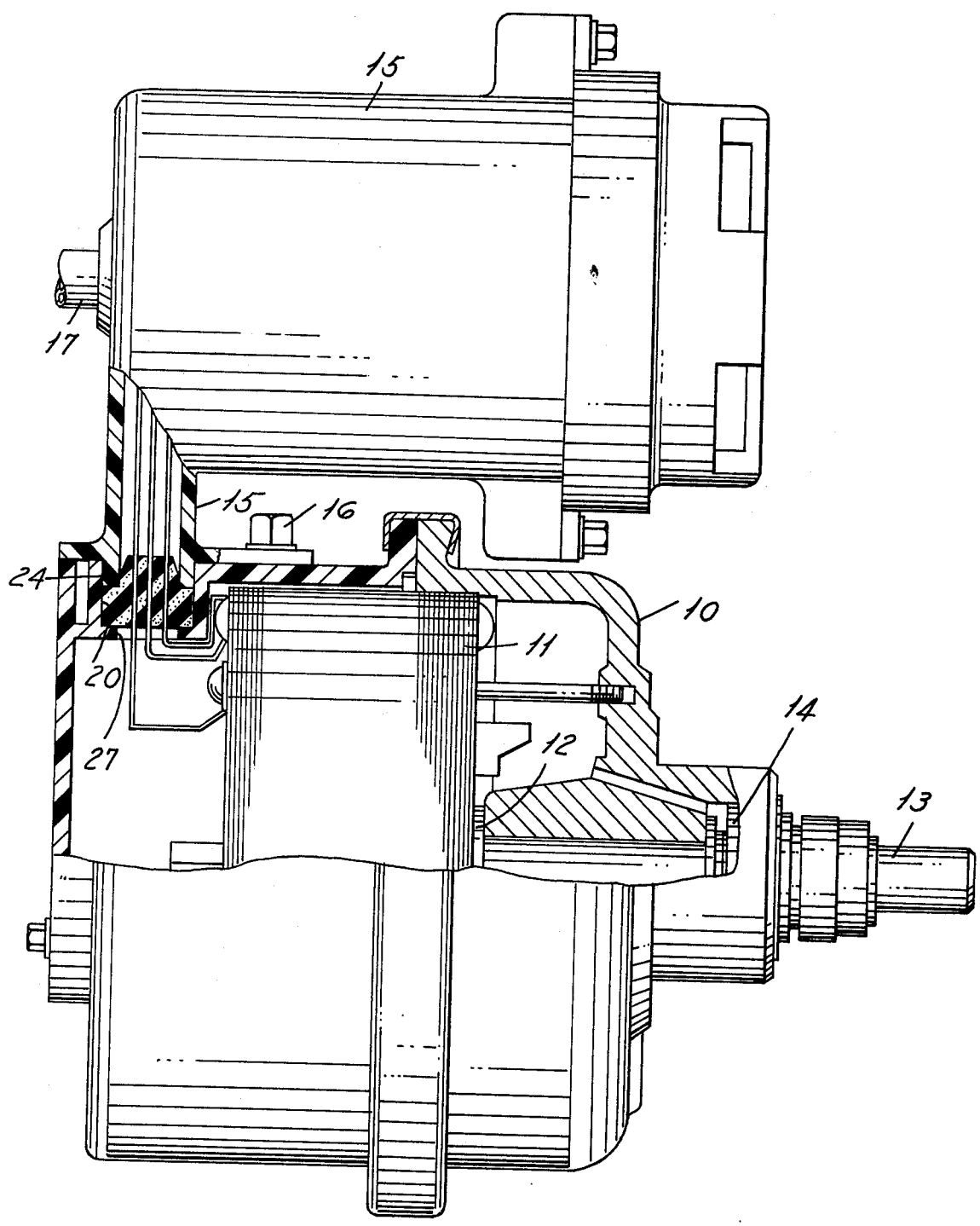
FIG. 1 is a part sectional elevational view of a submersible pump embodying the invention.

Referring to FIG. 1, the invention relates to submersible motors such as shown in FIG. 1 wherein a first frame or housing 10 comprising two halves which enclose the field stator 11 and rotor 12 on shaft 13, that may operate a pump impeller or the like. The interior of housing 10 is preferably filled with oil and appropriate oil seals 14 are provided between the housing 10 and shaft 13.

A second housing 15 is removably mounted on housing 10 by screws 16. Housing 15 has a cavity in which electrical connections are made between the leads from the motor housing 10 and a jacketed outlet cord 17 that is connected to a power source. In addition, the cavity of second housing may include a pressure switch, not shown, to which connections are made from the motor winding and cord 17.

The housings 10, 15 are preferably made of a water and heat resistant dimensionally stable material such as powdered iron or a glass reinforced styrene modified polyphenylene oxide sold under the trademark NORYL.

It is necessary to provide a seal between the ground wire 19 and leads 18 extending from the motor winding 9 into the cavity of the housing 15.

Figure 2:
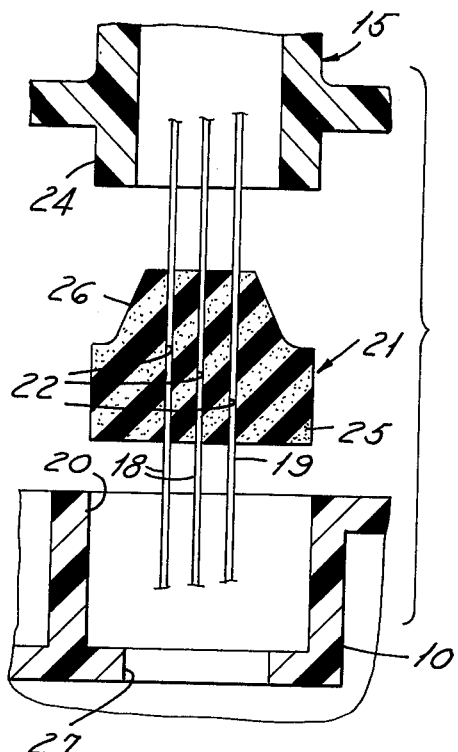
FIG. 2 is a fragmentary sectional exploded view on an enlarged scale of a portion of the motor in FIG. 1.
Figure 3:
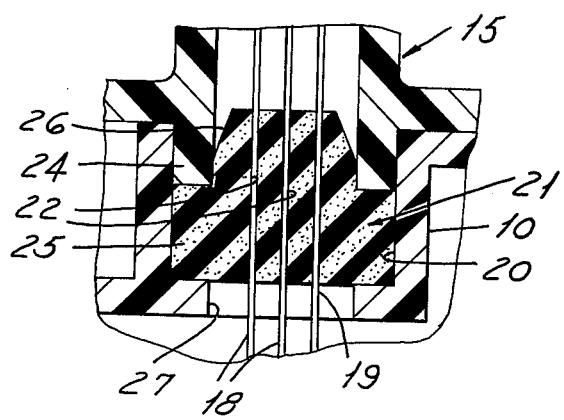
FIG. 3 is a fragmentary sectional view on an enlarged scale of the portion of the motor shown in FIG. 2 showing the parts in assembled condition.

Referring to FIGS. 2 and 3, housing 10 includes an open ended cylindrical cavity 20 in the periphery of the housing 10 in which the open end of the cavity 20 extends outwardly. A body or seal 21 of resilient compressible elastomeric material is positioned in cavity 20. The body is preferably made of acrylonitrilebutadiene rubber sold under the trademark BUNA N and having a shore durometer of 35 to 60 on the A scale so that it falls within the qualifications of soft rubber. Satisfactory results have been achieved with a rubber having a durometer of 50.

The body 21 has axial passages 22 through which the wires 18, 19 extend. The second housing 15 includes an annular wall or projection 24 that extends axially inwardly against the body 21. The body 21 includes a lower cylindrical portion 25 and preferably an upper frusto-conical portion 26. The wires 18, 19 are unencased, that is they do not have a covering. The wires 18 from the motor winding are coated, for example, with a modified polyester and nylon films, on the order of several thousandths of an inch in thickness such as conventionally found on film insulated copper or aluminum magnet wire used in the manufacture of electric motors. The ground wire 19 can be bare or similarly film insulated but in any case is unencased.

The diameter of the cylindrical portion 25 is slightly less than the diameter of the cavity 20 so that the body 21 can be readily inserted in the cavity 20. In addition the diameter of the passages or openings 22 is slightly greater than the diameter of the unencased wires 18, 19, so that the wires 18, 19 can be readily inserted through passages 22. The passages 22 preferably have a diameter between 100 and 130% of the diameter of the wires 18, 19.

Initially, wires 18, 19 are passed through an opening 27 inserted through passages 22 and the body 21 is placed in cavity 20.

The housing 15 is then brought into position adjacent housing 10 so that the tubular projection 24 extends into cavity 20. As screws 16 are tightened, the tubular projection 24 compresses the body 21 axially and radially to provide a seal between the periphery of the cavity 20 and the body 21 as well as between the wires 18, 19 and the body 21.

The diameter of the frusto-conical portion 26 at the base thereof is preferably greater than the internal diameter of the projection 24 so that a seal is also formed between the body 21 and the internal surface of projection 24.

In the final assembled position, the housings 10, 15 are in abutting contact.

Figure 4:
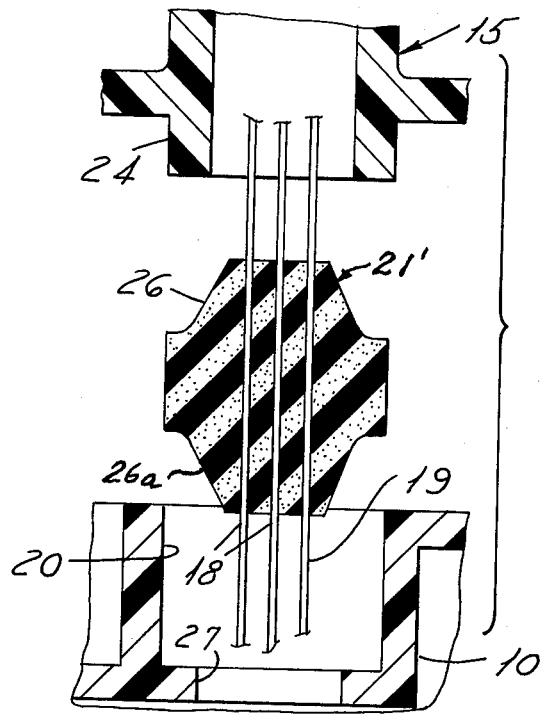
FIG. 4 is a fragmentary exploded view of a modified form of seal.
Figure 5:
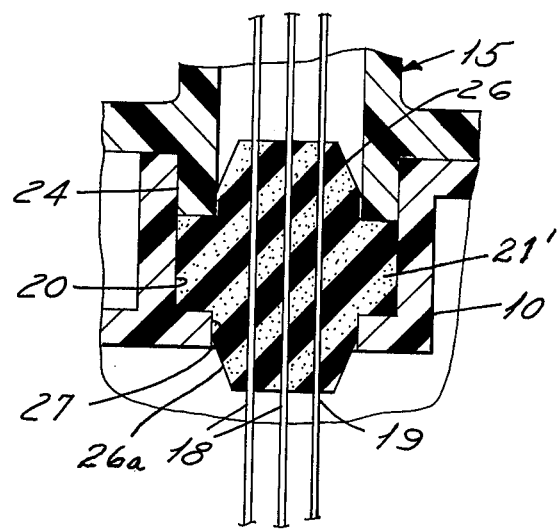
FIG. 5 is a fragmentary perspective view of the portion of the motor shown in FIG. 4, showing the parts in assembled condition.

In the modified form of the invention shown in FIGS. 4 and 5, the body 21' includes a second frusto-conical portion 26a which extends through opening 27. The diameter of frusto-conical portion 26a at its base is greater than the diameter of opening 27 so that the body 21' is compressed at that point to enhance sealing between body 21' and the housing 10.

I claim:

1. In a submersible motor or the like, the combination comprising a first housing containing a motor field stator having a field winding, a second plastic housing mounted on said first housing, said field having unencased field winding wires, said first housing having an open ended cylindrical cavity therein in the periphery thereof with the open end of said cavity extending outwardly of said housing, said first housing having an opening in the base of said cavity of lesser diameter than said cavity, a cylindrical body of compressible elastomeric material positioned in said cavity, said body being shaped such that it has a lower cylindrical portion and an upper frusto-conical portion which has a maximum diameter at the juncture with the cylindrical portion which is less than the diameter of the cylindrical portion, said cylindrical portion of said body having a diameter which conforms with the diameter of the cavity so that said body can be readily inserted in said cavity without substantial compression and which is greater than the diameter of said opening in the base of said cavity, said body having a plurality of generally axial passages therein, said unencased wires from said field winding having a diameter such that they can be readily inserted through said passages when said body is radially uncompressed, said second housing having a cylindrical tubular wall having a uniform thickness and an internal diameter less than the maximum diameter of said frusto-conical portion of said body, said tubular wall extending axially into the open end of said cavity and has a radial end surface, said frusto-conical portion having a greater diameter at its base than the internal diameter of said tubular wall, and mounting means for mounting said second housing on said first housing and drawing said housing toward one another to force said tubular wall axially into said cavity and against said body to compress said body when said second housing is in mounted position on said first housing thereby compressing the cylindrical portion of said body radially outwardly into tight conformity with the periphery of the cavity and radially inwardly into tight conformity with the unencased wires from the motor and thereby also compressing the frusto-conical portion radially outwardly against the interior said said tubular wall into tight conformity therewith and radially inwardly into tight conformity with said unencase wires, the part of said frusto-conical portion of said body radially inwardly of said tubular wall being unrestrained axially at one end of said body, the part of said cylindrical body radially inwardly of said opening in said cavity being unrestrained axially.

2. The combination set forth in claim 1 wherein said body having a second frusto-conical portion extending downwardly, said second frusto-conical portion extending through said opening in the base of said cavity, said second frusto-conical portion having a greater diameter at its base than the diameter of the opening in the bottom wall of said cavity.

* * * * *